United States Patent
Zhu et al.

(10) Patent No.: US 8,858,247 B2
(45) Date of Patent: Oct. 14, 2014

(54) ELECTRICAL CARD CONNECTOR

(71) Applicant: Hon Hai Precision Industry Co., Ltd., New Taipei (TW)

(72) Inventors: Fang-Yue Zhu, Kunshan (CN); Chun Ye, Kunshan (CN); Yu-Che Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/656,609

(22) Filed: Oct. 19, 2012

(65) Prior Publication Data

US 2013/0102171 A1 Apr. 25, 2013

(30) Foreign Application Priority Data

Oct. 20, 2011 (CN) .......................... 2011 2 0401363

(51) Int. Cl.
*H01R 13/62* (2006.01)
*G06K 13/08* (2006.01)
*G06K 7/00* (2006.01)

(52) U.S. Cl.
CPC .......... *G06K 13/0825* (2013.01); *G06K 7/0056* (2013.01)
USPC ........................................................ 439/159

(58) Field of Classification Search
CPC ............................ H01R 13/6335; H01R 13/635
USPC .......................................... 439/159, 157, 630
See application file for complete search history.

(56) References Cited

U.S. PATENT DOCUMENTS

| | | | | |
|---|---|---|---|---|
| 6,089,891 A * | 7/2000 | Nishioka | ........................ | 439/159 |
| 6,719,589 B2 * | 4/2004 | Nishio et al. | ................... | 439/630 |
| 6,776,640 B2 * | 8/2004 | Nishioka | ........................ | 439/325 |
| 6,802,726 B2 * | 10/2004 | Chang | ........................... | 439/159 |
| 7,507,098 B1 * | 3/2009 | Hung | ............................. | 439/159 |

FOREIGN PATENT DOCUMENTS

TW 553529 9/2003

* cited by examiner

*Primary Examiner* — Xuong Chung Trans
(74) *Attorney, Agent, or Firm* — Wei Te Chung; Ming Chieh Chang

(57) ABSTRACT

An electrical card connector 100 comprises an insulative housing 1 defining a card receiving space 12, a plurality of contacts 2 retained in the housing 1, an ejector 3 assembled to the housing 1 and a metal shell 4. The ejector 3 comprises a slider 31, a spring 32 and a cam follower 33 for controlling positions of the slider 31. The cam follower 33 comprises a pivoting end 331, a sliding end 333 and a connecting portion 332 connecting with the pivoting end 331 and the sliding end 333. The housing 1 has a recess 112 defining an opening along an up-to-down direction, the pivoting end 331 of the cam follower 33 is received in the recess 112 and extends laterally beyond an outer side of the recess 112, the shell 4 has a limiting portion 4102 mating with the recess 112 near the opening.

19 Claims, 6 Drawing Sheets

ELECTRICAL CARD CONNECTOR

BACKGROUND OF THE INVENTION

1. Field of the Invention

The present invention is generally related to an electrical card connector, and especially to an electrical card connector with an ejector.

2. Description of Related Art

TW Pat. No. 553529 discloses a conventional electrical card connector adapted for receiving an electrical card comprises an insulative housing, a plurality of contacts retained to the housing, an ejector and a metal shell covering the housing. The ejector comprises a slider defining an engaging portion which extends inwardly from an rear end of the slider, a spring abutting against the slider and a cam follower for controlling positions of the slider. The cam follower comprises a pivoting end, a sliding end and a connecting portion connecting with the pivoting end and the sliding end. The slider has a heart-shaped slot located on an outer surface thereof and a communal slot communicating with the heart-shaped slot. The housing defines a pivoting hole extending inwardly from an outside surface thereof for pivoting the pivoting end. In assembly, the slider and the spring are assembled to the housing, and then, the sliding end of the cam follower is assembled to the communal slot and the pivoting end of the cam follower is assembled to the pivoting hole. The pivoting end rotates in the pivoting hole to ensure it is smoothly when the card inserts into the electrical card connector or withdrawn from the electrical card connector. Recently, more and more contacts are insert-molded within the housings in order to simplify assembling processes and improve production efficiency. And the contact strip is feeded along an left-to-right direction, as a result, it is difficult to form the pivoting hole along the left-to-right direction. While for the conventional electrical card connector, the contacts can't insert-molded within the housing due to the pivoting hole must be formed along the left-to-right direction.

Hence, an improved electrical card connector is highly desired to overcome the aforementioned disadvantages of the prior art.

SUMMARY OF THE INVENTION

The present invention generally relates to an electrical card connector and more particularly to an electrical card connector with an ejector.

To achieve the above object, an electrical card connector adapted for receiving a card, comprises an insulative housing defining a card receiving space, a plurality of contacts retained in the housing, an ejector assembled to the housing and a metal shell coving the housing. The contacts comprising a contacting portion extending into the receiving space. the ejector comprises a slider, a spring disposed between the housing and the slider, and a cam follower for controlling positions of the slider. The slider comprises an engaging portion protruding into the receiving space to abut against a card, a heart-shaped slot located on an outside thereof and a communal slot communicating with the heart-shaped slot. The cam follower comprises a pivoting end, a sliding end and a connecting portion connecting with the pivoting end and the sliding end. The sliding end being movable among the heart-shaped slot and the communal slot. Wherein the housing has a recess defining an opening along an up-to-down direction, the pivoting end of the cam follower is received in the recess and extending laterally beyond the recess, the shell has a limiting portion entering the opening to mate with the recess.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
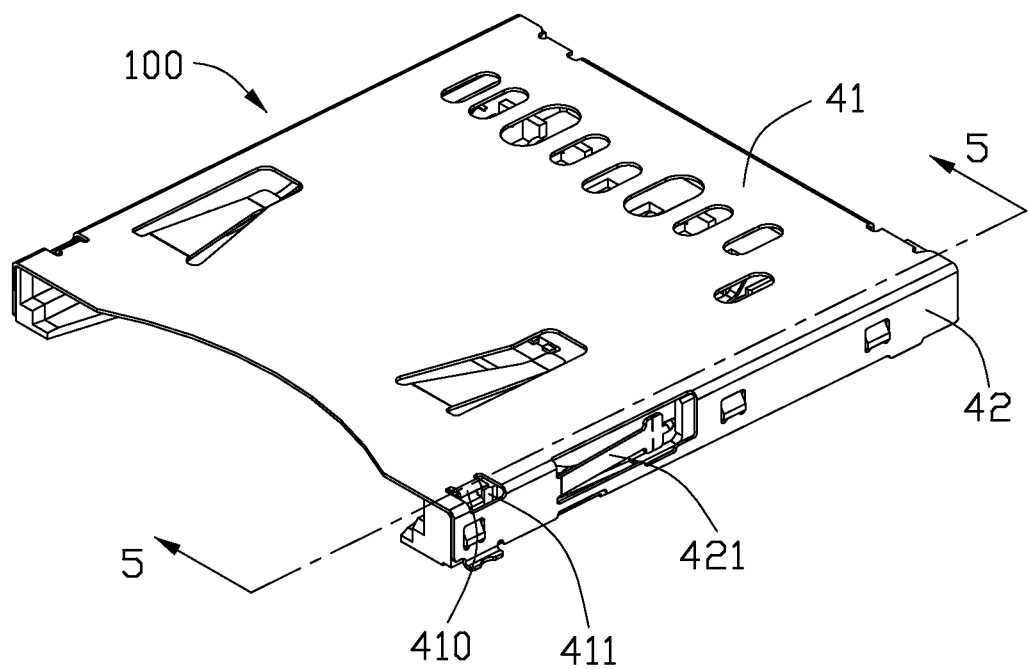
FIG. 1 is an assembled, perspective view of an electrical card connector in accordance with the present invention.
Figure 2:
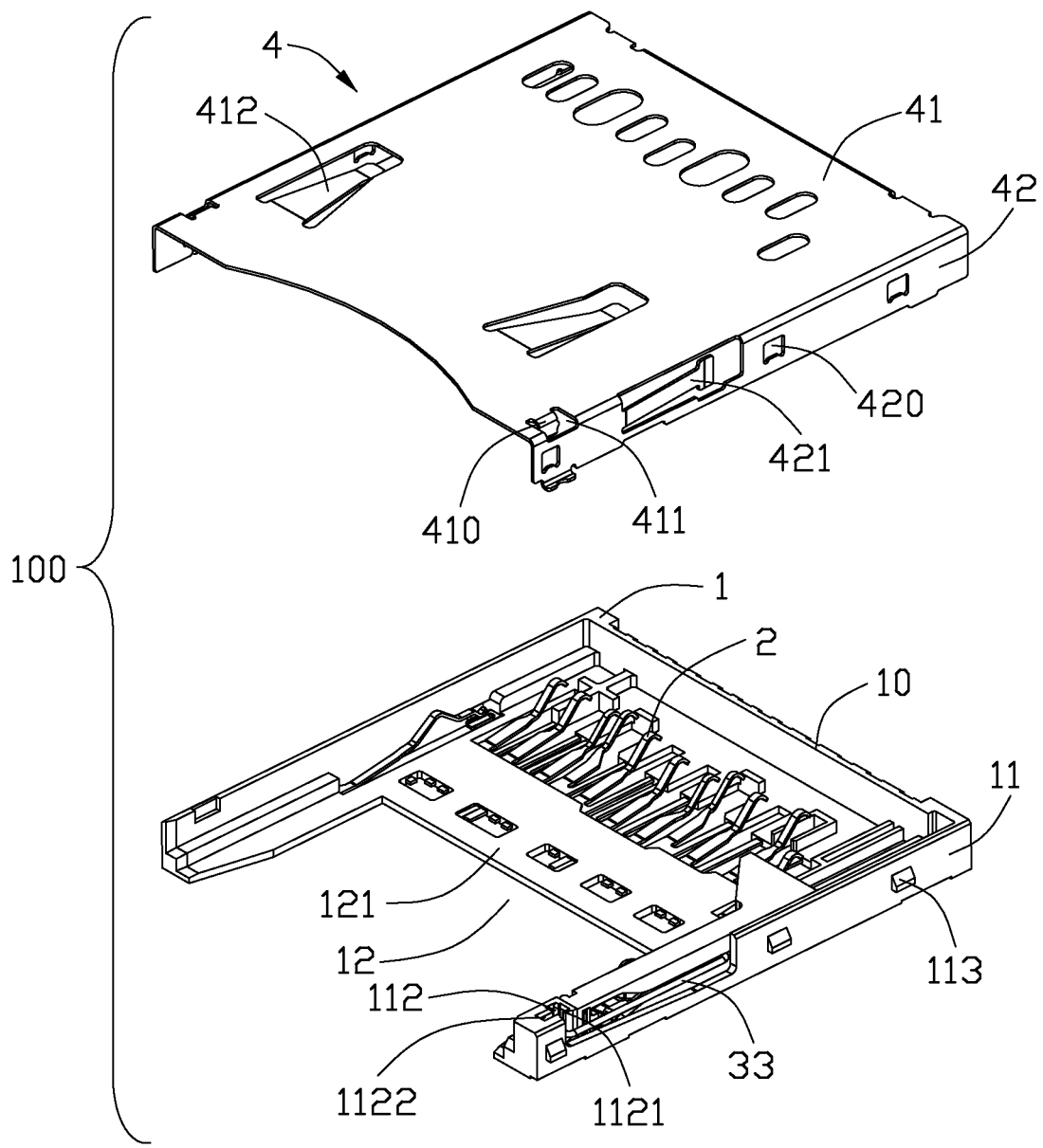
FIG. 2 is a partly assembled, perspective view of the electrical card connector in accordance with the present invention.
Figure 3:
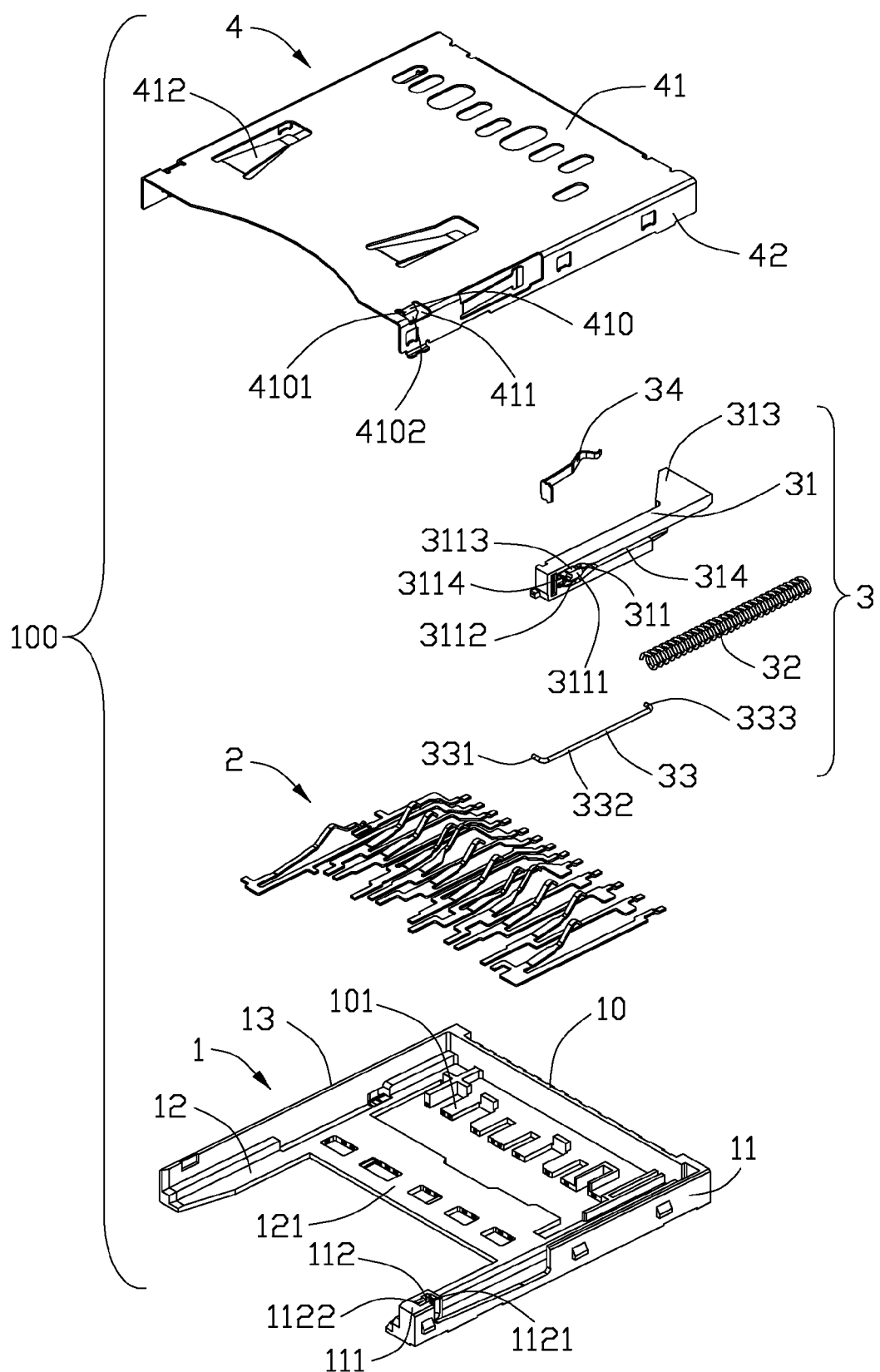
FIG. 3 is an exploded, perspective view of the electrical card connector in accordance with the present invention.

Referring to FIGS. 1-3, the electrical card connector 100 in accordance with the present invention is adapted for receiving a card (not shown). The electrical card connector 100 comprises an insulative housing 1, a plurality of contacts 2 received in the housing 1, an ejector 3 mounted to the housing 1 and a metal shell 4 covering the housing 1.

Figure 4:
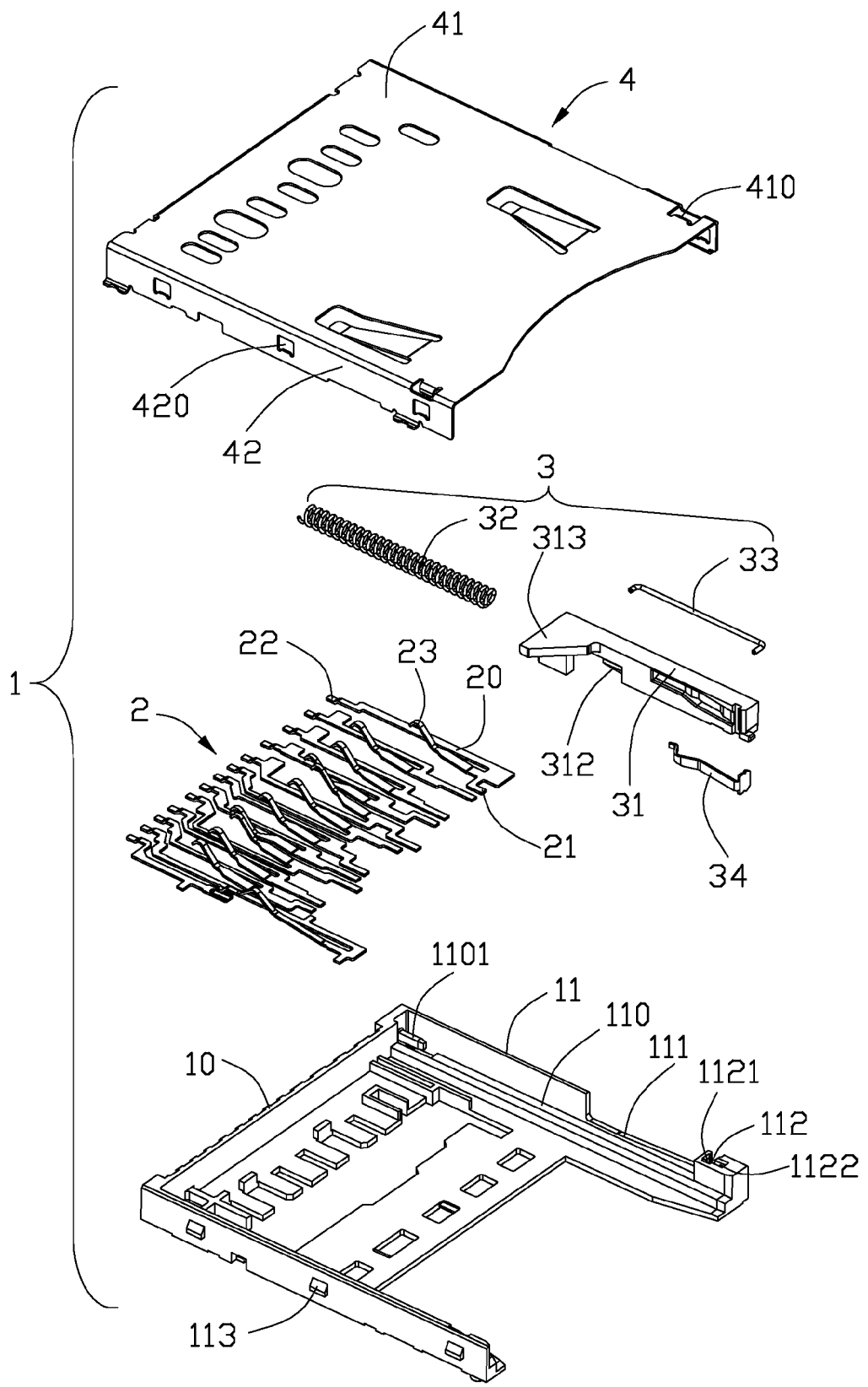
FIG. 4 is a view similar to FIG. 3, while taken from another aspect.
Figure 5:
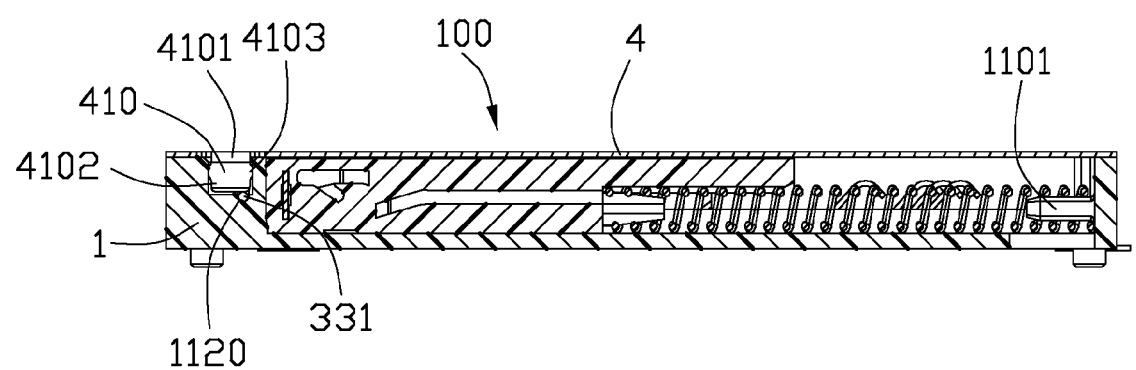
FIG. 5 is a sectional view of the electrical card connector, taken along line 5-5 as shown in the FIG. 1.

Referring to FIGS. 3-5, the housing 1 is approximately a rectangle configuration. The insulative housing 1 comprises a rear wall 10, a first side wall 13 and a second side wall 11 extending forwardly from two opposite sides of the rear wall 10, a plurality of clapboards 101 located in front of the rear wall 10 and a connecting wall 121 connecting with the first sidewall 13 and the second sidewall 11 and located in front of the clapboards 101. As observed from FIG. 3, the first sidewall 13 is located on a left side of the housing 1, and the second sidewall 11 is located on a right side of the housing 1. The rear wall 10, the first sidewall 13, the second sidewall 11 and the connecting wall 121 commonly define a card receiving space 12. A mounting slot 110 is defined between the receiving space 12 and the second sidewall 11 and extends along a front-to-back direction for receiving the ejector 3, and the second sidewall 11 has a through slot 111 communicating with the mounting slot 110 and extending outwardly through the sidewall 11 along an left-to-right direction.

The second sidewall 11 has a protruding post 1101 protruding into the mounting slot 110 from a rear end thereof and a front block 111 disposed at the front thereof with a recess 112 located on a top surface thereof. An opening of the recess 112 is upward. The recess 112 has a receiving slot 1121 and a limiting slot 1122 extending forwardly from the receiving slot 1121. The receiving slot 1121 defines a cambered bottom 1120 located on a bottom side thereof. In the left-to-right direction, the limiting slot 1122 is located on the middle of the second sidewall 11, the receiving slot 1221 extends through an outside surface of the second sidewall 11 and extends inwardly beyond the limiting slot 1222. A width of the limiting slot 1122 is less than that of the receiving slot 1121. The recess 112 is a T-shaped configuration when observe from a top side. Both of the first and second sidewalls 11, 13 are formed with a plurality of latching portions 113 for engaging with the shell 4.

Continuing to refer to FIG. 4, in this embodiment, the contacts 2 are insert-molded within the insulative housing 1 to decrease the forming process of the electrical card connector 100. Each contact 2 comprises an horizontal intermediate portion 20, a retaining portion 21 extending forwardly into the connecting wall 121 from the intermediate portion 20, a soldering leg 22 extending rearwardly into the clapboard 101 and ulteriorly extending beyond the housing 1, and a contacting portion 23 extending backwardly into the receiving space 12 from the intermediate portion 20.

Continuing to refer to FIGS. 3-4, the ejector 3 comprises a slider 31 moveably received in the housing 1 and being movable along the front-to-back direction, a spring 32 urging the slider 31 forwardly, a cam follower 33 for controlling positions of the slider 31 and a spring member 34 retained in an inner side of the slider 31. The slider 31 has a heart-shaped slot 311 located on an outside thereof, a heart-shaped bump 3111 surrounded by the heart-shaped slot 311, a communal slot 314 communicating with the heart-shaped slot 311, a retaining slot 312 located on a rear end of the slider 31 and an engaging portion 313 extending inwardly into the receiving space 12 from the rear end of the slider 31. The heart-shaped slot 311 has a forward guiding slot 3112 and a backward guiding slot 3113 extending upwardly and downwardly from one end of the communal slot 314 respectively and a locking slot 3114 connecting with the forward guiding slot 3112 and the backward guiding slot 3113. The spring 32 has two ends, one end surrounding the post 1101 and the other end retained in the retaining slot 312 to provide a needed elastic force when the card is ejected from the electrical card connector 100. The cam follower 33 has a pivoting end 331, a sliding end 333 and a connecting portion 332 connecting with the pivoting end 331 and the sliding end 333.

Figure 6:
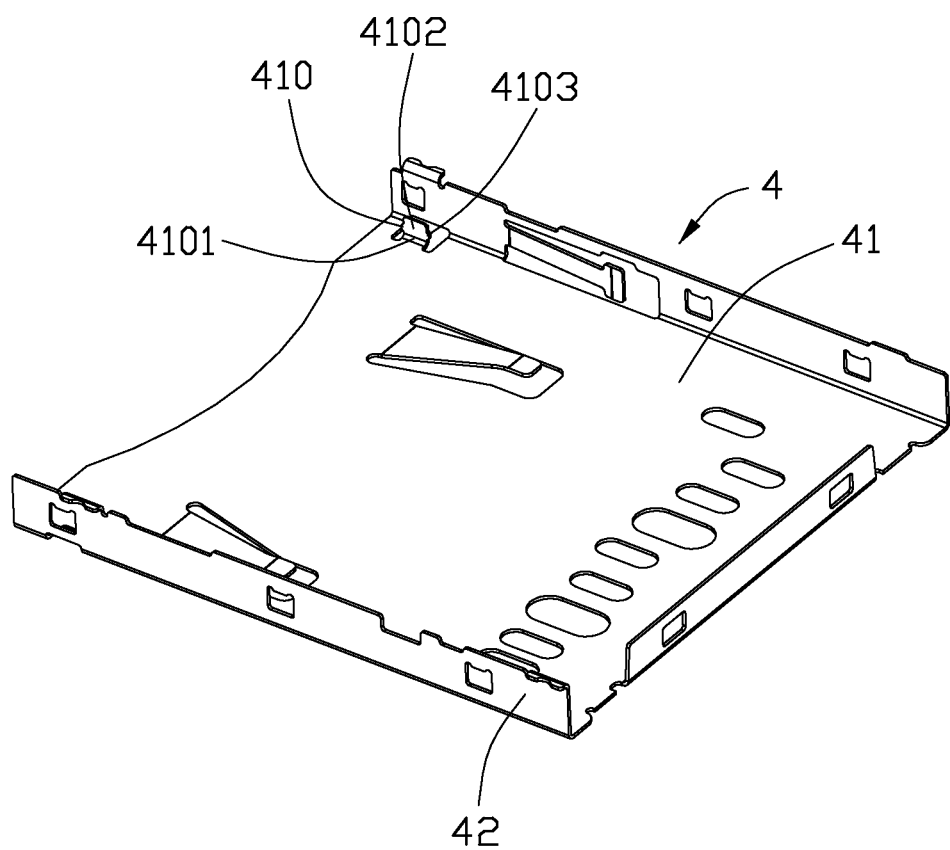
FIG. 6 is a perspective view of a shell of the electrical card connector.

Referring to FIGS. 3 and 6, the metal shell 4 is stamped from a metal sheet and covers the housing 1. The metal shell 4 comprises a top plate 41 and a pair of lateral plates 42 extending downwardly from the top plate 41. The top plate 41 has two elastic portions 412 extending downwardly into the receiving slot 12, a flange 410 extending downwardly into the recess 112, and an opening 411 surrounding the flange 410. Each lateral plate 42 has a plurality of mating holes 420 engaging with the latching portion 113 of the housing 1 and an abutting portion 421 extending inwardly into the through slot 111 to abut against the cam follower 33. The flange 410 comprises a bend portion 4101 connecting with an inner edge of the opening 411, and a limiting portion 4102 extending downwardly from the bend portion 4101 and defining a plurality of barbs 4103 located on two opposite sides thereof. The limiting portion 4102 is a vertical flakiness, and parallels with the lateral plate 42 and defines a gap with the corresponding lateral plate 42 therebetween. The limiting portion 4102 extends downwardly into the recess 112 and abuts against the pivoting end 331. The barbs 4103 interfere with two opposite inner walls of the recess 12 for prevent the limiting portion 4102 from moving upwardly.

Referring to FIGS. 1-6, in assembly, the slider 31 of the ejector 3 is received in the mounting slot 110 of the housing 1, one end of the spring 32 surround the post 1101 of the second sidewall 11, the other end of the spring 32 retained is in the retaining slot 312 of the slider 31. And then, the sliding end 333 of the cam follower 33 is assembled inwardly to the communal slot 314, the cam follower 33 rotates downwardly by taking the sliding end 333 as a pivot to make the pivoting end 331 of the cam follower 33 be assembled downwardly to the bottom 1120 of the receiving slot 1121. The pivoting end 331 extends outwardly beyond an outside surface of the second sidewall 11. At last, the shell 4 covers the housing 1. The mating hole 420 of the lateral plate 42 locks with the latching portion 113 of housing 1. The abutting portion 421 crosses the through slot 111 to abut against the cam follower 33 for preventing the cam follower 33 from moving outwardly. The limiting portion 4102 of the flange 410 downwardly enters into the recess 112. A front portion of the limiting portion 4102 is received in the limiting slot 1122 to prevent the limiting portion 4102 from shaking along the left-to-right direction and a rear portion of the limiting portion 4102 extends through the receiving slot 1121 of the recess 112 to abut against the pivoting end 331 along the up-to-down direction. The bottom 1120 of the receiving slot 1121 and a part of the limiting portion 4102 received in the receiving slot 1121 commonly define a pivoting hole. The pivoting end 331 is received in the pivoting hole and rotates in the pivoting hole to ensure the pivoting end 331 can rotate freely when the card inserts into the electrical card connector 100 or withdrawn from the electrical card connector 100.

When the card is inserted into the electrical card connector 100, an rear end of the card abuts against the engaging portion 313 of the slider 31 to bring the slider 31 to move with the card. At the same time, the sliding end 333 of the cam follower 33 moves to the forward guiding slot 3112 from the communal slot 314, and then moves into the locking slot 3114 to arrive its final position, a force between the cam follower 33 and the slider 31 is in balance with that between the slider 31 and the spring 32. When the card being withdrawn from the electrical card connector 100, the user pushes the card rearwardly to make the sliding end 333 moves rearward to the backward guiding slot 3113 from the locking slot 3114, by this way, the spring 32 presses the slider 31 forwardly and make the slider 31 move forwardly until the sliding end 333 returns to the original position.

In another embodiment, the limiting portion 4102 of the shell 4 can be substituted by a separate piece of metal or an insulative block. The separate piece of metal or the insulative block mates with the recess 112 also can achieve the purpose that above preferred embodiment want to achieved.

While a preferred embodiment in accordance with the present invention has been shown and described, equivalent modifications and changes known to persons skilled in the art according to the spirit of the present invention are considered within the scope of the present invention as described in the appended claims.

What is claimed is:
1. An electrical card connector comprising:
an insulative housing defining a receiving space;
a plurality of contacts retained in the housing and having a contacting portion extending into the receiving space;
a metal shell covering the housing; and
an ejector assembled to the housing, the ejector having a slider, a spring located between the insulative housing and the slider, and a cam follower for controlling positions of the slider; the slider comprises an engaging portion protruding into the receiving space for abutting against a card, a heart-shaped slot located on an outside thereof and a communal slot communicating with the heart-shaped slot; the cam follower having a pivoting end, a sliding end and a connecting portion connecting with the pivoting end and the sliding end, the sliding end being movable among the heart-shaped slot and the communal slot;
wherein the housing has a recess defining an opening along an up-to-down direction, the pivoting end of the cam follower is received in the recess and extending outwardly beyond the recess from a lateral side surface of the recess, the shell having a limiting portion entering the opening to mate with the recess;
wherein the limiting portion and the recess commonly define a pivoting hole to receive the pivoting end of the cam follower.

2. The electrical card connector as claimed in claim 1, wherein the limiting portion is a vertical flakiness and inserts into the recess, and has a plurality of barbs on two opposite sides thereof to interfere with the recess.

3. The electrical card connector as claimed in claim 1, wherein the shell comprises a top plate and a pair of lateral plates extending downwardly from the top plate, the top plate has a flange, the flange has a bend portion connecting with the top plate, the limiting portion extends downwardly into the recess from the bend portion, the limiting portion parallels with the lateral plate and define a gap with the corresponding lateral plate therebetween.

4. The electrical card connector as claimed in claim 1, wherein the housing comprises a rear wall, a first sidewall and a second sidewall extending forwardly from the rear wall, a front block is disposed at the front of the second sidewall, the recess is recessed in a top surface of the front block.

5. The electrical card connector as claimed in claim 1, wherein the limiting portion engages with the pivoting end along the up-to-down direction.

6. The electrical card connector as claimed in claim 1, wherein the contacts are insert-molded within the housing and define a row of soldering legs that extends rearwardly beyond the housing.

7. The electrical card connector as claimed in claim 1, wherein the recess has a receiving slot and a limiting slot extending forwardly from the receiving slot, the receiving slot extends through an outside surface of the second sidewall, the limiting slot is located on the middle of the second sidewall along an left-to-right direction.

8. The electrical card connector as claimed in claim 7, wherein the receiving slot defines a cambered bottom to support the pivoting end.

9. The electrical card connector as claimed in claim 7, wherein a width of the limiting slot is less than that of the receiving slot along the left-to-right direction, the recess is a T-shaped configuration when be observed along the up-to-down direction.

10. The electrical card connector as claimed in claim 7, wherein a front portion of the limiting portion is received in the limiting slot to prevent the limiting portion from shaking along the left-to-right direction, a rear portion of the limiting portion is received in the receiving slot, the bottom of the receiving slot and the rear part of the limiting portion commonly define the pivoting hole, the pivoting end rotates in the pivoting hole.

11. An electrical card connector, comprising:
an insulative housing defining a receiving space;
a plurality of contacts retained in the housing and comprising a contacting portion extending into the receiving space;
a metal shell covering the housing; and
an ejector assembled to the housing, the ejector comprises a slider, a spring disposed between the insulative housing and the slider, and a cam follower for controlling positions of the slider; the slider having an engaging portion protruding into the receiving space to abut against a card, a heart-shaped slot on an outer surface thereof and a communal slot communicating with the heart-shaped slot; the cam follower comprises a pivoting end, a sliding end and a connecting portion connecting with the pivoting end and the sliding end, the sliding end being movable among the heart-shaped slot and the communal slot; wherein
the housing has a recess, the pivoting end of the cam follower is assembled in the recess from a top side, the shell defines a limiting portion to abut against the pivoting end;
wherein the limiting portion extends downwardly into the recess from a top plate of the shell, the limiting portion and the recess commonly define a pivoting hole and the pivot end rotates in the pivoting hole.

12. The electrical card connector as claimed in claim 11, wherein the recess comprises a receiving slot and a limiting slot extending forwardly from the receiving slot, the receiving slot extends through an outside surface of the housing, the receiving slot defines a cambered bottom, the bottom and the limiting portion commonly define a pivoting hole to receive the pivoting end of the cam follower.

13. The electrical card connector as claimed in claim 12, wherein the housing comprise a rear wall and a second sidewall extending forwardly from the rear wall, a front block is disposed at the front of the second sidewall, the recess is recessed in a top surface of the front block, the limiting slot is located on the middle of front block along an left-to-right direction.

14. The electrical card connector as claimed in claim 12, wherein a width of the limiting slot is less than that of the receiving slot along the left-to-right direction, the recess is a T-shaped configuration when be observed along an up-to-down direction.

15. The electrical card connector as claimed in claim 12, wherein the limiting portion extends downwardly into the recess, a front portion of the limiting portion is received in the limiting slot to prevent the limiting portion from shaking along the left-to-right direction, a rear portion of the limiting portion is received in the receiving slot, the bottom and the rear part of the limiting portion commonly define the pivoting hole, the pivoting end rotates in the pivoting hole.

16. An electrical card connector for use with an electronic card, comprising:
an insulative housing defining an upward facing card receiving space and an ejector receiving area beside the card receiving space;
a plurality of contacts located around the card receiving space for contacting the corresponding electronic card in a vertical direction;
an ejector subassembly disposed around the ejector receiving area and back and forth moveable along a front-to-back direction perpendicular to said vertical direction, said ejector subassembly including a slider with a card engaging portion around one end region and a heart-shaped slot therein, a spring constantly urging the slider forwardly, a rod type cam follower defining a pivot end pivotally assembled into a recess of the housing and a slide end received in and moveable along the heart-shaped slot when the slider is back and forth moved; and
a metallic shell assembled to an upper face of the housing to confine the card receiving space in the vertical direction; wherein
said shell defines a tab to press the pivot end and cooperate with the housing to restrict movement of the pivot end;
wherein the tab extends downwardly into the recess from a top plate of the shell, the tab and the recess commonly define a pivoting hole and the pivot end rotates in the pivoting hole.

17. The electrical card connector as claimed in claim 16, wherein said recess extends through the upper face in the vertical direction for injection molding consideration.

18. The electrical card connector as claimed in claim 17, wherein the pivot end defines a pivotal axis, about which the cam follower is pivotal, extending along a transverse direction perpendicular to both the vertical direction and the front-to-back direction, and said tab restrict movement of the pivot end in a vertical plane defined by the vertical direction and the front-to-back direction.

19. The electrical card connector as claimed in claim 18, wherein said shell further includes a portion cooperating with the housing to restrict movement of the pivot end in the transverse direction.

* * * * *